(12) United States Patent
Schlenker et al.

(10) Patent No.: US 12,728,517 B2
(45) Date of Patent: Sep. 8, 2026

(54) WORKPIECE STORAGE DEVICE, METHOD FOR ASSESSING THE LOADING STATE OF A PICK-UP DEVICE AND METHOD FOR CREATING A MACHINE LEARNING MODEL

(71) Applicant: Hoffmann Engineering Services GmbH, Munich (DE)

(72) Inventors: Hans Schlenker, Munich (DE); Ritavan, Munich (DE); Katrin Schindler, Munich (DE); Thomas Mültner, Augsburg (DE)

(73) Assignee: Hoffmann Engineering Services GmbH, Munich (DE)

( * ) Notice: Subject to any disclaimer, the term of this patent is extended or adjusted under 35 U.S.C. 154(b) by 299 days.

(21) Appl. No.: 18/668,947

(22) Filed: May 20, 2024

(65) Prior Publication Data

US 2024/0308759 A1 Sep. 19, 2024

Related U.S. Application Data

(63) Continuation of application No. PCT/EP2022/082958, filed on Nov. 23, 2022.

(30) Foreign Application Priority Data

Nov. 23, 2021 (EP) .................................... 21210019

(51) Int. Cl.
*B25H 3/00* (2006.01)
*B25H 3/02* (2006.01)
(Continued)

(52) U.S. Cl.
CPC ............... *B25H 3/00* (2013.01); *B25H 3/028* (2013.01); *B25H 3/06* (2013.01); *G01D 5/20* (2013.01);
(Continued)

(58) Field of Classification Search
CPC . B25H 3/00; B25H 3/028; B25H 3/06; G01D 5/20; G06F 18/24; G06N 7/00;
(Continued)

(56) References Cited

U.S. PATENT DOCUMENTS 5,353,930 A * 10/1994 Berry, Jr. ................ B29C 51/14 206/439
5,947,284 A * 9/1999 Foster .................... A61B 50/30 206/364
(Continued)

FOREIGN PATENT DOCUMENTS

CN 104487207 A * 4/2015 ............... G07C 9/28
EP 2 014 424 1/2009
(Continued)

OTHER PUBLICATIONS

Int'l Search Report (Form PCT/ISA/210) counterpart Int'l Appln. No. PCT/EP2022/082958 (Mar. 2, 2023).
(Continued)

*Primary Examiner* — Thomas Randazzo
(74) *Attorney, Agent, or Firm* — GREENBLUM & BERNSTEIN, P.L.C.

(57) ABSTRACT

Workpiece storage device having at least one sensor; a control device; and pick-up device with receptacles individually adapted to shapes of workpieces to be received in the receptacles. The at least one sensor is configured to acquire sensor data to determine the presence and/or location of workpieces in the receptacles, and to transmit the sensor data to the control device. The control device is configured to receive the sensor data of the sensor and to feed the received sensor data as input values to at least one machine learning model, and the machine learning model is trained to calculate at least one binary output value from the input values. The at least one binary output value is indicative of whether a statement about a loading state of the
(Continued)

pick-up device is applicable, and the control device is configured to generate a signal including the at least one binary output value.

20 Claims, 3 Drawing Sheets

(51) Int. Cl.
*B25H 3/06* (2006.01)
*G01D 5/20* (2006.01)
*G06F 18/24* (2023.01)
*G06N 7/00* (2023.01)
*G06N 20/00* (2019.01)

(52) U.S. Cl.
CPC ............... *G06F 18/24* (2023.01); *G06N 7/00* (2013.01); *G06N 20/00* (2019.01); *B65G 2203/0216* (2013.01); *B65G 2203/0233* (2013.01); *B65G 2203/0258* (2013.01); *B65G 2203/046* (2013.01)

(58) Field of Classification Search
CPC ............ G06N 20/00; B65G 2203/0216; B65G 2203/0233; B65G 2203/0258; B65G 2203/046
See application file for complete search history.

(56) References Cited

U.S. PATENT DOCUMENTS

| | | | | |
|---|---|---|---|---|
| 2013/0232039 | A1 | 9/2013 | Jackson et al. | |
| 2017/0263084 | A1* | 9/2017 | Millius | B25H 3/06 |
| 2020/0027026 | A1 | 1/2020 | Cool et al. | |
| 2020/0407162 | A1 | 12/2020 | Fly et al. | |
| 2021/0026453 | A1* | 1/2021 | Ketyko | G06N 3/088 |
| 2022/0327332 | A1* | 10/2022 | Straehle | G06F 18/24 |
| 2024/0242178 | A1* | 7/2024 | Rogers | B25H 3/00 |

FOREIGN PATENT DOCUMENTS

| | | | | |
|---|---|---|---|---|
| GB | 2 406 092 | | 3/2005 | |
| JP | 2000061758 A | * | 2/2000 | B23Q 3/157 |

OTHER PUBLICATIONS

Int'l Written Opinion (Form PCT/ISA/237 counterpart Int'l Appln. No. PCT/EP2022/082958 (Mar. 2, 2023).

* cited by examiner 21
10
23
22
24
11
11
11
11
11
25

10
26
15
12
14
11
14
14

WORKPIECE STORAGE DEVICE, METHOD FOR ASSESSING THE LOADING STATE OF A PICK-UP DEVICE AND METHOD FOR CREATING A MACHINE LEARNING MODEL

CROSS-REFERENCE TO RELATED APPLICATION

This application is a continuation of International Application No. PCT/EP2022/082958 filed Nov. 23, 2022, which claims the priority of European Application No. 21210019.2 filed Nov. 23, 2021, the disclosures of which are expressly incorporated by reference herein in their entireties.

BACKGROUND

1. Field of the Invention

Embodiments are directed to a workpiece storage device that includes at least one sensor, a control device, an output device and a pick-up device with receptacles for workpieces. The receptacles are individually adapted to a shape of the workpieces. Embodiments are also directed to a method for assessing the loading state of a pick-up device and a method for creating a machine learning model

2. Discussion of Background Information

From GB 2 406 092 B, a merchandise management system is known, by which the removal and replacement of workpieces in a container is monitored. Such merchandise management systems can be helpful, in order to determine, whether workpieces have been returned to their spot after use or whether they have been lost or stolen. For example, this can be very important when aircraft are being repaired, as there is a risk of serious consequences in the case that a workpiece is left inside a turbine of the aircraft.

In order to prevent workpieces from not being placed back in the repositories and to be able to monitor this, foam inserts are usually used in which recesses are provided that match the shape and size of the workpiece. An operator can thus easily realize, whether all workpieces are received in the receptacles provided for this purpose. However, this is time-consuming. Besides, this may not be safe enough for some applications, as similar workpieces are possibly introduced into receptacles, which can be mixed up with the workpieces actually intended therefor.

A workpiece is understood to be, in particular, a tool as well as, for example, mounting material and small components, such as screws, nails, bolts, resistors, cables, plugs, plug sockets and the like. In addition, workpieces are also understood to be personal protective gear, such as safety glasses, protective gloves, hearing protection, helmets and the like. Mounting material may also be understood to be boxes or repositories for mounting material, for example, repositories for milling cutters or drills or repositories for screws. In particular, workpieces are understood to be tools such as screwdrivers, hammers, torque wrenches, cordless screwdrivers and the like or accessories such as (interchangeable) measuring heads, ratchets, bits and the like or spare parts, adapters, holders or milling cutters, drills, cutting heads, etc.

From US 2020/0407162 A1, an automatic tool checking system is known, with which the position and state of the tools in the system can be monitored. For this purpose, the system includes sensors, for example cameras, RFID sensors, Bluetooth sensors, contact sensors, capacitive sensors, inductive sensors or weight sensors.

However, the assessment of the loading state of a pick-up device by sensors is not quite easy, especially with the use of capacitive or inductive sensors, since the sensor data output by the sensors depend on physical changes in their environment. An incorrect evaluation of the sensor signals may therefore lead to an incorrect assessment of the loading state.

SUMMARY

Embodiments of the present invention improve the reliability of the recognition of the presence and/or location of a workpiece in a receptacle of a pick-up device.

In particular, a workpiece storage device includes at least one sensor, a control device and a pick-up device with receptacles for workpieces, in which the receptacles are individually adapted to the shape of the workpieces. The at least one sensor is configured to acquire sensor data, by which the presence and/or location of the workpieces in the receptacles are determinable, and to transmit the sensor data to the control device, which is configured to receive the sensor data of the sensor and to feed them as input values to at least one machine learning model. The machine learning model is trained to calculate at least one binary output value from the input values, where the binary output value indicates whether a statement about a loading state of the pick-up device is applicable. The control device is configured to generate a signal including the binary output value.

Advantageously, a reliable statement about the loading state of the pick-up device can be made by the workpiece storage device. The loading state of the pick-up device indicates, in particular, whether and how the receptacles are filled with workpieces. By feeding the sensor data of the at least one sensor to a machine learning model specially trained therefor, the physical changes in the environment of the at least one sensor are taken into account during the evaluation of the sensor data.

In particular, the workpiece storage device includes several sensors that are arranged in a sensor array. In particular, the receptacles are arranged in the vicinity of the sensors such that the sensor data of a single sensor are affected by the presence or absence of several workpieces and/or the sensor data of several sensors are affected by the presence or absence of a single workpiece. In such a case, not every workpiece is assigned exactly one single sensor. Precisely in this case, a machine learning model for evaluation of the sensor data is very advantageous, since the presence of the assigned workpiece can no longer be inferred from the evaluation of a single sensor signal.

A machine learning model is a prediction or decision model that has been created by a machine learning algorithm by training on training data. According to an embodiment, the machine learning model is stored on a data store of the control device. According to an alternative embodiment, the machine learning model is preferably stored externally, in particular in a cloud resource. For executing the machine learning model, the control device particularly accesses the cloud resource.

The machine learning model outputs one or more binary output values. A binary output value is a single binary value that is "0" or "1". If the binary output value is "1", this means that the statement about the loading state is applicable. In contrast, if the binary output value is "0", the statement does not apply. The binary output value is a class, which is assigned to the input values. The present machine learning model is therefore a binary classification model. In particular, the machine learning model is a random forest model or an extreme gradient boosting model or a combination of these models. The classification models are specifically well suited for the classification of the sensor data.

In particular, the receptacles are introduced, in particular milled or cut, into the pick-up device. The pick-up device is made, for example, of a foam or another suitable material. For example, the pick-up device is an insert for a drawer of a tool cabinet or an insert for a tool case.

In particular, the at least one sensor includes an electronic proximity sensor, in particular a capacitive and/or an inductive sensor. Electronic proximity sensors generate an electric or electromagnetic field in the working area, in which an object is to be detected. The presence or type and/or location or position of the object changes a defined or predeterminable electromagnetic field and thereby can be detected by the sensor. In particular, the at least one sensor is arranged in the area or the vicinity of the receptacles. In particular, the at least one sensor is arranged in a sensor device, which is located in particular below the pick-up device or is integrated into the pick-up device. In particular, the sensor device includes a plurality of sensors, for example capacitive and/or inductive sensors. In particular, the sensors are arranged in the area of the receptacles such that the presence and/or location of workpieces in all receptacles of the pick-up device is detectable.

In particular, the control device is a computer, in particular a single-board computer, for example a Raspberry Pi 4. A single-board computer is advantageous as it can be easily accommodated in the workpiece storage device. According to an embodiment, the workpiece storage device includes a single control device and a plurality of receptacles that are monitored by the control device.

Preferably, the control device is configured to transmit the signal to at least one interface of the workpiece storage device, wherein in particular the workpiece storage device is configured to transmit the signal, in particular wirelessly or by wire, from the interface to an output device of the workpiece storage device and/or an external data processing system.

Through the output device, a user is informed whether or not the statement about the loading state is applicable. In particular, the output device is an optical output device, in particular an LED and/or a screen, and/or an acoustic output device and/or a haptic output device. For example, a status message about the loading state is displayed on a screen based on the binary output value. The status message can also be output acoustically. A haptic signal can be output, for example, when at least one workpiece is missing. The external data processing system includes, for example, a central workpiece management system of a factory, a computer, and/or a smartphone. Through the external data processing system, the loading state of the receptacles is documented and/or the user is informed, whether or not the statement about the loading state is applicable.

The workpiece storage device is, for example, a cabinet, a case, a repository, a packet, a shelf, a drawer, a workbench, a (mobile) container, an assembly cart, or a similar device that is suitable for picking up workpieces.

Preferably, the binary output value indicates, whether all of the receptacles are filled with workpieces, and/or whether exactly one receptacle does not contain a workpiece, and/or whether more than one receptacle does not contain a workpiece.

Through a binary output value, which indicates whether all the receptacles are filled with workpieces, a statement about the complete loading of the receptacle device can be made in a simple manner. The three statements mentioned are exclusive, that is exactly one binary output value representing the statements must always reach the value "1" and the remaining binary output values have the value "0". Provided that all three binary output values are existent, the reliability of the statements can be checked in this way. If more or less than one binary output value has the value "1", at least one binary output value has not been correctly determined.

The sensor data are preferably fed to several machine learning models that calculate binary output values for different statements about the loading state.

By feeding the sensor data to several machine learning models, different statements can be made about the loading state, so that the exact loading state is determinable more reliably. For example, for all three of the aforementioned statements, the sensor data are each fed to a machine learning model, which independently of each other calculate binary output values for the aforementioned different statements.

Preferably, the control device is configured to determine an overall statement about the loading state from the binary output values, which have been calculated by said several machine learning models. The determination of the overall statement takes place by linking the binary output values by predetermined linking rules and/or by feeding the binary output values to a further machine learning model.

An overall statement indicates, for example, which ones of the receptacles are filled with which workpieces. For this purpose, it is taken into account, for example, which ones of the receptacles are empty, which ones of the receptacles are filled with the individually adapted workpieces, and which ones of the receptacles are filled with other workpieces. The linking rules for linking the binary output values indicate, in particular, which binary output values are to be taken into account and be disregarded in the case of a contradiction with other binary output values.

In particular, the at least one machine learning algorithm determines a probability value for the binary output value, which indicates the probability, with which the indicated binary output value is correct. In particular, the probability value is used as an indicator therefor, which binary output value is primarily taken into account in the case of a contradiction between several binary output values. In particular, an overall probability for the overall statement is determined by the probability values of the binary output values. In particular, several overall statements are determined, wherein the one overall statement, whose overall probability is the highest, is assumed to be applicable and output. In particular, the signal includes the overall statement. In this way, the overall statement can be displayed through the output device and/or transmitted to the external data processing system. In particular, the overall statement is output to a user together with a reliability indicator. In particular, the reliability indicator is the overall probability of the overall statement and/or a statement describing the overall probability. For example, this describing statement is that the overall statement is correct with high probability or that the overall statement possibly applies and the user should verify this.

Alternatively or additionally, the binary output values are fed as input values to a further machine learning model, which outputs the overall statement as output. For this purpose, the further machine learning model has been trained previously with training data from different binary output values, and in particular with probability values for the binary output values.

Preferably, an assigned machine learning model is stored on the memory device for each receptacle, the assigned machine learning models being trained to calculate individual binary output values from the sensor data, indicating, respectively, whether the workpiece individually adapted to the assigned receptacle is located in the assigned receptacle.

Thus, for each receptacle, an individual binary output value is generated, which indicates whether the individually adapted workpiece is arranged in the receptacle. The individual binary output values are taken into account, in particular, as the basis for statements about the loading state, which indicate that workpieces are missing in one or more of the receptacles and which receptacles these are. In particular, the individual binary output values are taken into consideration for determining the overall statement about the loading state.

In particular, in the case of removal of a workpiece, the time of removal and/or the removing user is acquired and stored. The user is identified, in particular, by an identification tag, for example, of an employee card.

Preferably, the control device is configured to specify from the individual binary output values how many receptacles do not contain a workpiece and/or which receptacles do not contain a workpiece.

This gives the user precise information about the loading state. In particular, through the output device it is displayed how many and/or which receptacles do not contain a workpiece.

In particular, by one or more machine learning models a binary output value is determined that indicates whether at least one workpiece arranged in a receptacle corresponds to a previously defined original workpiece.

In particular, for at least one receptacle, in particular all receptacles, a binary output value is calculated, which indicates whether a workpiece arranged in this receptacle corresponds to a previously defined original workpiece. The original workpiece is the one that has been placed in the assigned receptacle during the training of the machine learning model or models. If another workpiece is placed in this receptacle, which, for example, looks similar but consists of a different material, the sensor data generated by the sensors will differ. This difference in the sensor data is evaluated by the machine learning model or models in order to determine that the placed workpiece is not the original workpiece.

In particular, the workpiece storage device includes an opening state sensor, by which it is determinable whether the pick-up device or a bin, in which the pick-up device is arranged, is open or closed. In particular, the at least one sensor only acquires sensor data, if by the opening state sensor has been determined that the pick-up device or the bin is closed. In this way, external disturbances in the evaluation of the loading state are reduced.

According to an embodiment, the workpiece storage device is configured to acquire and transmit to the control device an ambient condition value. The control device is configured to feed the ambient condition value as input value to the at least one machine learning model, and the machine learning model is trained to take the ambient condition value into account during the determination of the at least one binary output value.

The ambient condition value provides a conclusion about one or more ambient conditions. Ambient conditions are, in particular, external influences such as ambient temperature, humidity or air pressure of the surrounding air. Such ambient conditions, especially the ambient temperature, can have a significant effect on the sensor data of the sensors. Thus, for example, an ambient temperature that significantly differs from the ambient temperature during the training process may result in that the loading state of the pick-up device will be erroneously recognized. In order to increase the reliability of the determination of the loading state, the at least one ambient condition is therefore taken into account during the determination of the loading state by feeding the ambient condition value to the at least one machine learning model as additional input value. In particular, the at least one machine learning model has been previously trained for different ambient condition values of the ambient conditions to be taken into account, so that it takes into account the effect of the ambient conditions on the output value, and the reliability of the output is increased.

The ambient condition value is determined, in particular, by a sensor. In particular, the ambient condition value is determined by one of the at least one sensors, which serves as a reference sensor. The ambient condition value is, in particular, a sensor value of the reference sensor. For example, the reference sensor may be a capacitive or inductive sensor that is constructed in the same way as at least some of the other sensors. In particular, the reference sensor is a sensor whose sensor data are not affected by, or only slightly affected by, the placing of the workpieces. The effects of the ambient conditions on the remaining sensors constructed in the same way can be taken into account and/or eliminated by the reference sensor. The concrete effect of single ambient conditions on the reference sensor does not have to be known. The only decisive factor is that the other sensors are affected by the ambient conditions in the same way as the reference sensor.

Alternatively, the sensor used for determining the ambient condition value is a sensor specifically configured for measuring the ambient condition, for example, a temperature sensor, a humidity sensor, or an air pressure sensor.

According to a further embodiment, the workpiece storage device is configured to acquire and transmit to the control device an ambient condition value, in particular an ambient temperature or a measured value of a reference sensor. The control device is configured to assess the effect of the ambient condition on the sensor values by a mathematical model and to normalize the sensor values with the help of the ambient condition value before the sensor values are fed to the at least one machine learning model.

According to this embodiment, a mathematical model is therefore first created, which describes the dependency of the sensor values of the at least one sensor on the ambient condition or conditions. By measuring a current ambient condition value, it is then possible to eliminate the influence of the ambient condition on the sensor data by the mathematical model before the sensor data are fed to the machine learning model or models. In this way, it is avoided that the loading state of the pick-up device is erroneously determined by changing ambient conditions.

Moreover, embodiments are solved by a method for assessing the loading state of a pick-up device with receptacles for workpieces, in which the receptacles are individually adapted to the shape of the workpieces. At least one sensor acquires sensor data by which the presence and/or location of the workpieces in the receptacles are determinable, and transmits the sensor data to a control device that receives the sensor data of the sensor and feeds them as input values to at least one machine learning model. The machine learning model calculates at least one binary output value from the input values, in which the binary output value indicates whether a statement about a loading state of the receptacles is applicable, wherein the control device generates a signal including the binary output value.

The method for assessing the loading state of a pick-up device with receptacles for workpieces embodies the same advantages, features, and properties as the workpiece storage device described previously.

Still further, embodiments are solved by a method for creating a machine learning model for assessing the loading state of a pick-up device with receptacles individually adapted to the shape of workpieces, in which a number of different training data sets is created. Each training data set contains sensor data, which have been acquired by at least one sensor for defined loading states. The loading states, for which the individual training data sets have been recorded, differ from each other. The sensor data are fed to the machine learning model as input values for a training of the machine learning model, in which training of at least one binary output value for each of the different loading states is predetermined to the machine learning model. The binary output value indicates whether a statement about the loading state is applicable.

The method for creating a machine learning model embodies the same advantages, features, and properties as the workpiece storage device previously described and the method previously described for assessing the loading state of a pick-up device with receptacles for workpieces.

By the method for creating a machine learning model, effectively, a reliably operating machine learning model is trained that can assess the loading state of the pick-up device. For this purpose, the sensor data are read out for different loading states and fed in each case to the machine learning model as training data sets. For creating the training data sets, the sensor data of all sensors are recorded and stored together with a status information about the current loading state. The recording of the sensor data takes place in particular for ten seconds to ten minutes, in particular for one minute. The interval between the acquiring of the single measured values of one recording is in particular 0.1 to 10 seconds, in particular 1 second. By these training data sets, the machine learning model can be effectively trained, in order to recognize the loading state with great reliability later in use.

Preferably, the different loading states include a loading state with completely filled pick-up device, and for each receptacle a loading state, in which exclusively this receptacle is empty, wherein, in particular, the number of training data sets corresponds to at least twice the number of receptacles in the pick-up device.

The training data sets thus contain a loading state with a completely filled pick-up device and, for each receptacle in the pick-up device, a loading state in which the respective receptacles are not filled. The remaining receptacles, however, are filled. In order to arrive at a number of training data sets that corresponds to at least twice the number of receptacles in the pick-up device, in particular, loading states with random loading are selected for the remaining training data sets. For example, for a random loading for each receptacle is randomly selected whether this receptacle is filled or empty.

According to an embodiment, for at least one loading state, in particular several loading states, training data sets are acquired under different ambient conditions, in particular ambient temperatures and an ambient condition value of the ambient condition is predetermined as an input value to the machine learning model in training, in order to take into account, the dependency of the sensor data on the ambient temperatures in the machine learning model.

By creating training data sets under different ambient conditions, the effect of the ambient conditions on the sensor data can be determined and compensated by measuring the ambient condition during the later application of the machine learning model. The ambient condition value, which is measured during creating the respective training data sets, is fed to the machine learning model or models during the training. In this way, for example, the effect of the ambient temperature, the humidity or the air pressure on the sensor data can be eliminated and/or taken into account.

According to a further embodiment, the dependency of the sensor data on at least one ambient condition, in particular the ambient temperature, is described by a mathematical model that is determined by acquiring sensor data for different ambient conditions, and in particular also for different loading states, and analysis of the acquired sensor data as a function of the ambient condition. In particular, the sensor data are normalized by the mathematical model before they are fed to the machine learning model as input values for a training of the machine learning model.

According to this variant, a mathematical model is first determined, which describes the dependency of the sensor values on the ambient condition or conditions. This mathematical model is used to normalize the sensor data before they are fed to the machine learning model or models for training.

In particular, for training the machine learning model, some of the training data sets are used respectively as validation data and the remaining training data sets are used as training data. In this way, the machine learning model is always trained with data that does not belong to the validation data set and is validated on data unknown until then. Thereby is ensured that the training and validation configurations are unequal and an overfitting is avoided.

According to an embodiment, the temperature of workpieces placed in the receptacles is taken into account by training the machine learning model with loading states, in which single workpieces each have a temperature deviating from the ambient temperature, or by measuring the object temperature of the workpieces by local sensors and taking into account the effect of the object temperature on the sensor values fed to the machine learning model by a mathematical model.

In this way, errors during the determination of the loading state are avoided, which occur, in that a heated or cooled workpiece is placed in the pick-up device. Since electronic proximity sensors are temperature-sensitive, such a workpiece with deviating temperature would result in an erroneous evaluation of the loading state. By taking into account the deviating temperature this error can be rectified.

In particular, during training the machine learning model a stochastic noise is taken into account, by additionally feeding sensor data with synthetic errors as input values to the machine learning model during the training. Alternatively, noise present on the sensor data is analyzed and used as the basis for a mathematical noise model. The mathematical noise model is subject to fluctuations and applied to the input values. In this way, the machine learning model becomes considerably more robust with respect to stochastic changes in the environment.

Preferably, sensor data recorded during the operation of the pick-up device are used in order to post-train the machine learning model.

In other words, the machine learning model is not only trained once, before it is employed for assessment of the loading state of a pick-up device, but the sensor data recorded during the assessment of the loading state are also used for post-training. The post-training, in this case, does not happen, in particular, with the manufacturer of the workpiece storage device, but happens automated with the user. So, it is post-trained in the special environment of the user over the lifetime of the workpiece storage device, possibly over years. In particular, data recognized as safe are used for post-training. Data recognized as safe are, in particular, those binary output values with high probability values. In this way, for example, sensor aging can be taken into account and the data diversity is considerably increased. Thus, the workpiece storage device is updated and adapted to local conditions over its lifetime.

Providing a workpiece storage device includes, in particular, the following steps:

At first, the workpiece storage device is manufactured. For this purpose, a pick-up device with receptacles is manufactured, which are individually adapted to predetermined workpieces. The sensor or sensors are attached in the vicinity of the receptacles. A control device and an output device are provided. Subsequently, training data sets are recorded by reading out and storing the sensor data for different loading states of the pick-up device. With these training data sets one or more machine learning models are trained. In particular, the training occurs on a computer system separate from the control device. This separate computer system is, for example, a cloud resource that provides significantly more computing power than the control device. After the machine learning model or models have been trained, they are copied to the data store of the control device. Now, the assessment of the loading state can take place on the control device by the machine learning model. Alternatively, the training can also occur on the control device itself. Likewise, the assessment of the loading state can also take place through the cloud resource.

Further features of the invention will become apparent from the description of the embodiments according to the invention together with the claims and the attached drawings. Embodiments according to the invention may fulfill individual features or a combination of several features.

In the context of the invention, features being identified with “in particular” or “preferably” are to be understood as optional features.

Other exemplary embodiments and advantages of the present invention may be ascertained by reviewing the present disclosure and the accompanying drawings.

BRIEF DESCRIPTION OF THE DRAWINGS

The invention will be described below without restricting the general inventive idea on the basis of exemplary embodiments with reference to the drawings, and regarding any details according to the invention which are not explained further in the text reference is expressly made to the drawings. They show in.

DETAILED DESCRIPTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
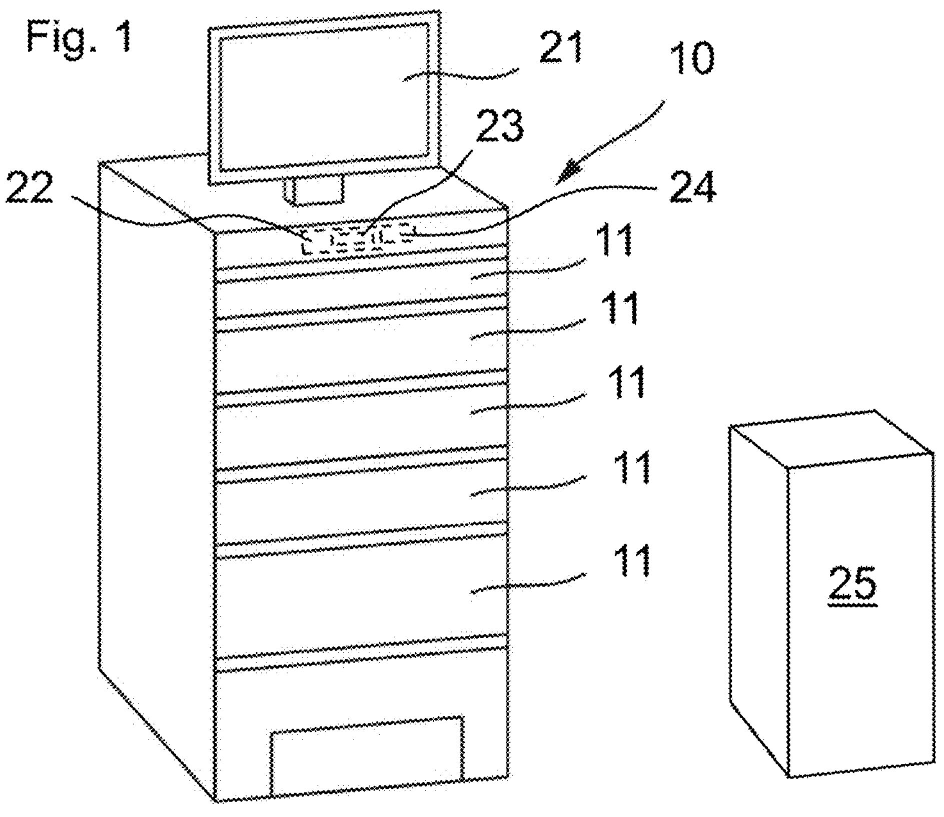
FIG. 1 is a schematic perspective illustration of a workpiece storage device.

FIG. 1 schematically shows a simplified a three-dimensional perspective illustration of a workpiece storage device 10. The workpiece storage device 10 comprises five bins 11 designed as drawers that can be pulled out from the workpiece storage device 10. An output device 21 in the form of a screen is also illustrated, on which the presence and/or location of workpieces in a pick-up device can be graphically displayed. The workpiece storage device 10 includes a control device 22 illustrated by dashed lines with a data store 23. An interface 24 transmits data and signals from the control device 22 to the output device 21 and/or to an external data processing system 25. The dashed lines indicate that the control device 22, the data memory 23, and the interface 24 are located inside the workpiece storage device 10 and would normally not be visible from the outside. Control device 22 can include at least one and one or more storage devices storing sets of computer-readable instructions, which can include machine learning models, which may be a prediction or decision model that has been created by a machine learning algorithm by training on training data, that are executable by the at least one processor to perform the described methods. Moreover, the machine learning model may be stored, e.g., on external data processing system 25 or in a cloud resource accessible by the at least one processor of control device 22.

Figure 2:
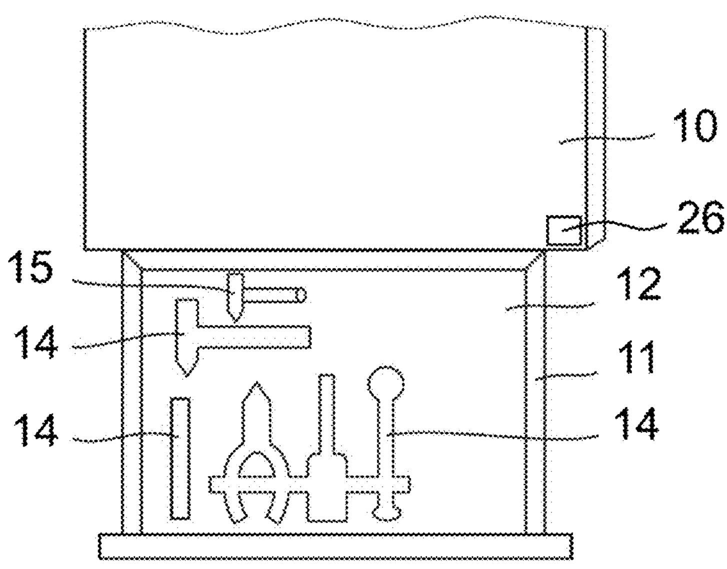
FIG. 2 is a schematically simplified plan view of a workpiece storage device with a pick-up device.

In FIG. 2 a plan view of a workpiece storage device 10 is schematically shown, in which a bin 11 in the form of a drawer has been pulled out. A pick-up device 12, which is made, for example, of rigid foam, is introduced in the bin 11. The pick-up device 12 comprises receptacles 14 designed as recesses, in which workpieces 15 can be introduced. The receptacles 14 are individually adapted to the shape of workpieces 15. By way of example, a workpiece 15 configured as a hammer in FIG. 2 is shown placed on the pick-up device 12, but not in a receptacle 14 provided for receiving this hammer. Moreover, in the exemplary illustration in FIG. 2, the hammer configured workpiece 15 is smaller than the hammer-shaped receptacle 14 provided in pick-up device 12, such that the illustrated hammer-shaped receptacle 14 is not the appropriate receptacle 14 that has been individually adapted for this hammer-shaped workpiece 15. An opening state sensor 26 is arranged to determine whether the pick-up device 12 or bin 11 is open or closed.

Figure 3:
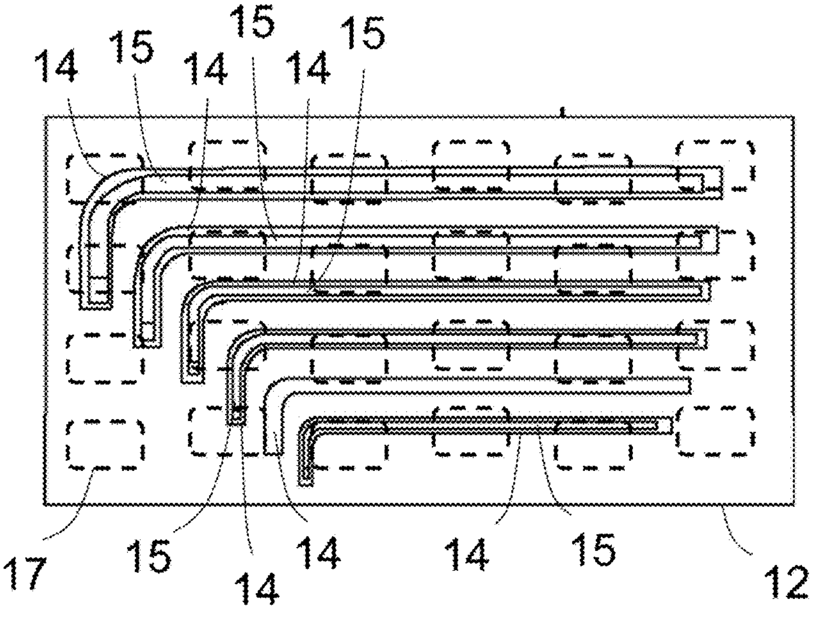
FIG. 3 is a schematically simplified illustration of a pick-up device for workpieces with several sensors.

FIG. 3 shows a plan view of a further pick-up device 12. This pick-up device 12 comprises six receptacles 14 that are designed for receiving hexagon socket wrenches. While workpieces 15 in the form of hexagon socket wrenches are shown arranged in five of the receptacles 14, one of the receptacles 14 is missing a hexagon socket wrench workpiece 15. Below the pick-up device 12, a range or array of sensors 17 are arranged, which are illustrated by dashed lines in FIG. 3. For the sake of clarity, only one of the sensors 17 is provided with a reference sign. The sensors 17 are, for example, inductive sensors and/or capacitive sensors, by which the loading of the pick-up device 12 with the workpieces 15 is realizable. For this purpose, the sensors 17 are arranged, for example, in a matrix below the pick-up device 12.

Figure 4:
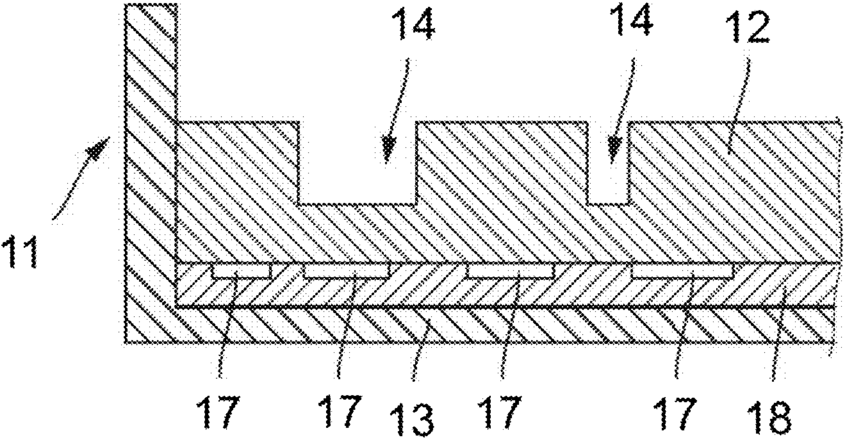
FIG. 4 is a schematic sectional illustration through a bin of a workpiece storage device.

FIG. 4 shows schematically a sectional illustration of a part of a bin 11. For example, it includes of a metal drawer with a metallic bottom 13. On the metallic bottom 13, a sensor device 18 is arranged, in which a range or array of sensors 17 are introduced. The sensor device 18 may, for example, be inductive sensors and/or capacitive distance sensors and/or capacitive proximity switches. A distance between the conductive bottom 13 and the sensors 17 arranged parallel thereto can be ensured or made possible by a foam plate or device made of foam or plastic.

Here, the function of the proximity switch is based on a change of the electric and/or electromagnetic field in the environment of the sensor electrode. The sensor 17 operates, for example, with an RC oscillator circuit. For example, the capacitance between the active electrode and the electrical ground potential is measured. The capacitance between two electrodes, which are applied on the sensor device 18, may also be measured. By approaching the active zone of the sensor 17 with a substance or material, the capacitance changes. The capacitance value is measured by the sensor 17.

The sensor device 18 is arranged below the pick-up device 12 or is integrated into the lower area of the pick-up device 12. The pick-up device 12 may, for example, consist of rigid foam or include rigid foam.

During the assessment of the loading state of the pick-up device 12 by the sensors 17, difficulties can arise in that physical changes in the environment of the sensors 17 can have a considerable effect on the sensor data. The effect of this physical change on the measured values is a complex, non-linear and open mathematical problem. However, in order to achieve a reliable assessment of the loading state, a machine learning model is trained to obtain meaningful statements about the loading state from the sensor data of the sensors 17.

Figure 5:
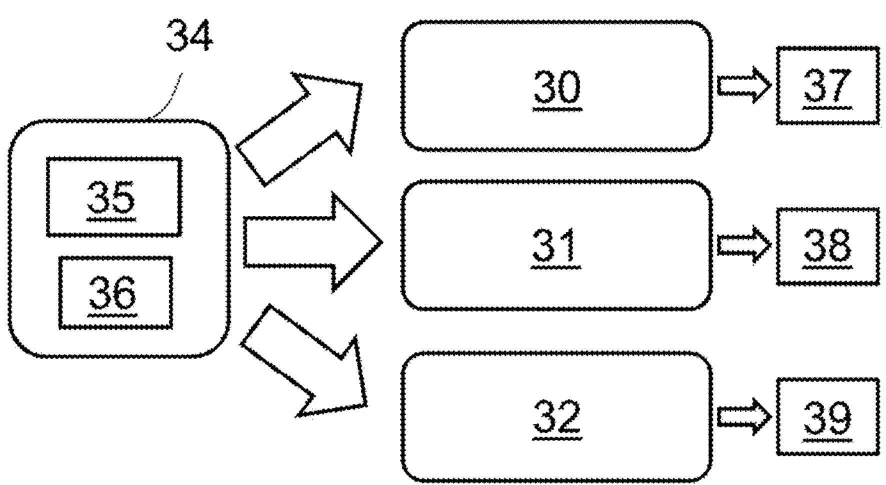
FIG. 5 is a schematically simplified illustration of machine learning models for assessing the loading state of pick-up devices.

FIG. 5 schematically shows three different machine learning models 30, 31, 32 for assessment of the loading state of the pick-up devices 12. The machine learning models can be stored, e.g., on control device 22, external data processing device 25 or in a cloud resource, and can be accessed and executed by at least one processor, e.g., in control device 22 or in the cloud resource. These machine learning models 30, 31, 32 are trained to calculate binary output values 37, 38, 39 in each case from the input values 34 in form of the sensor data 35. Thus, the machine learning models 30, 31, 32 are binary classification models that assign a class "0" or a class "1" to the input values 34. This is the predictive value with which the machine learning models 30, 31, 32 make a statement about the loading state of the pick-up device 12 on the basis of the sensor data 35. For example, with the machine learning model 30, the statement is verified whether or not (predictive value "0") the pick-up device is completely filled (predictive value "1"). By machine learning model 31, for example, the statement is verified whether or not exactly one workpiece 15 is missing. For example, the machine learning model 32 verifies the statement whether or not more than one workpiece 15 is missing. According to an embodiment, for each receptacle 14 a separate machine learning model 31 is provided indicating whether or not that receptacle 14 is filled with the workpiece 15.

Although only three machine learning models 30, 31, 32 are shown in FIG. 5, fewer or considerably more machine learning models 30, 31, 32 may also be employed. For example, machine learning models 30, 31, 32 may be provided in order to check whether a workpiece 15 placed in a receptacle 14 corresponds to an original workpiece. The original workpiece is the workpiece 15 with which the machine learning model 30, 31, 32 has been trained.

From the binary output values 37, 38, 39, further statements about the loading state of the pick-up device 12 may also be determined. For example, the number of missing workpieces 15 may be realized and which workpieces 15 are exactly missing.

In particular, the binary output values 37, 38, 39 have a probability value indicating the probability, with which apply the statements represented by the binary output values 37, 38, 39. By combination of the binary output values 37, 38, 39, an overall statement about the loading state can be determined, for example, by predetermined linking rules and/or by feeding the binary output values 37, 38, 39 to a further machine learning model. Also, the overall statement is assigned a probability, which results from the probability values. The overall statement with the highest probability is assumed to be true and displayed on the output device 21. This overall statement indicates, for example, which receptacles 14 are empty and in which receptacles 14 original workpieces are not placed. Such an overall statement about the loading state assists the operator to correctly fill the pick-up device 12, as well as to identify and search missing workpieces 15.

In order to increase the accuracy of the prediction, ambient conditions, such as ambient temperature, humidity of the ambient air and/or air pressure of the ambient air, are also taken into account. The ambient conditions are determined, for example, with a sensor provided specifically for this purpose or a sensor 17 serving as a reference sensor. According to one procedure, an ambient condition value 36 is already measured during the training of the machine learning models 30, 31, 32, so that training data sets are created at different ambient conditions. By these training data sets, the machine learning models 30, 31, 32 are trained to also take into account the ambient condition value 36 during the determination of the loading state. This one is fed as further input value 34 to the machine learning models 30, 31, 32 for determination of the loading state.

According to another method, the dependency of the sensor values 35 on the ambient condition or conditions is described by a mathematical model. For creation of this mathematical model, sensor data 35 are recorded under changing ambient conditions, in order to determine the dependency. An analysis and mathematical modeling of the sensor values 35 as a function of the ambient conditions allow for the creation of a mathematical model that describes this dependency. Both during training and during the subsequent use of the machine learning model 30, 31, 32, the sensor data 35 are normalized by the mathematical model before being fed to the machine learning model 30, 32, 32. In this way, the dependency of the sensor data 34 on the ambient conditions can be eliminated.

Figure 6:
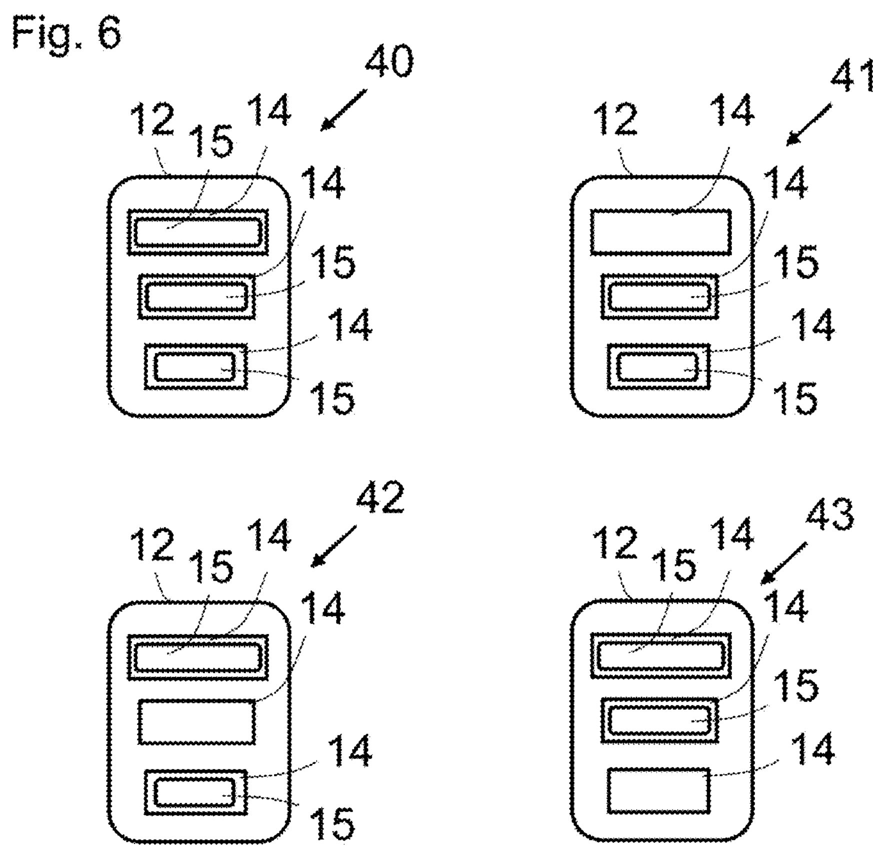
FIG. 6 is a schematically simplified illustration of a pick-up device with different loading states.

For training of the machine learning models 30, 31, 32, a range of training data sets with different loading states are generated. FIG. 6 shows four different loading states 40, 41, 42, 43 for an exemplary pick-up device 12. In this example, a training data set with a loading state 40 is generated in which the pick-up device 12 is completely and correctly loaded. Subsequently, a number of training data sets is created corresponding to the number of receptacles 14. Each training data set corresponds to a loading state 41, 42, 43, in which one of the receptacles 14 is not filled, but the other receptacles 14 are filled. Finally, a range of further randomly defined loading states, not shown in FIG. 6, are still selected and training data sets are generated for these loading states. The machine learning models 30, 31, 32 are trained with these training data sets.

If subsequent to the training it is determined that the machine learning models 30, 31, 32 do not provide accurate predictions for some loading states, the machine learning models 30, 31, 32 are post-trained for these loading states.

All of the cited features, also including those to be taken from the drawings alone, as well as individual features, which are disclosed in combination with other features, are considered alone and in combination as essential to the invention. Embodiments according to the invention may be fulfilled by individual features, or a combination of several features.

Moreover, it is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

LIST OF REFERENCE SIGNS

10 workpiece storage device
11 bin
12 pick-up device
13 bottom
14 receptacle
15 workpiece
17 sensor
18 sensor device
21 output device
22 control device
23 data store
24 interface
25 external data processing system
26 opening state sensor
30, 31, 32 machine learning model
34 input values
35 sensor data
36 ambient condition value
37, 38, 39 binary output value
40, 41, 42, 43 loading state

What is claimed:

1. A workpiece storage device comprising:
at least one sensor;
a control device; and
a pick-up device with receptacles individually adapted to shapes of workpieces to be received in the receptacles,
wherein the at least one sensor is configured to acquire sensor data to determine the presence and/or location of the workpieces in the receptacles, and to transmit the sensor data to the control device,
wherein the control device is configured to receive the sensor data of the sensor and to feed the received sensor data as input values to at least one machine learning model,
wherein the at least one machine learning model is trained to calculate at least one binary output value from the input values,
wherein the at least one binary output value is indicative of whether a statement about a loading state of the pick-up device is applicable, and
wherein the control device is configured to generate a signal including the at least one binary output value.

2. The workpiece storage device according to claim 1, wherein the control device is configured to transmit the signal to at least one interface of the workpiece storage device, and the workpiece storage device is configured to transmit, wirelessly or by wire, the signal from the interface to at least one of an output device of the workpiece storage device or an external data processing system.

3. The workpiece storage device according to claim 1, wherein the at least one binary output value indicates:
whether all of the receptacles are filled with workpieces,
whether exactly one receptacle does not contain a workpiece, and/or
whether more than one receptacle does not contain a workpiece.

4. The workpiece storage device according to claim 1, wherein the at least one sensor comprises an ambient condition sensor configured to acquire and transmit to the control device an ambient condition value,
wherein the control device is configured to feed the ambient condition value as an input value to the at least one machine learning model,
wherein the machine learning model is trained to take into account the ambient condition value during the determination of the at least one binary output value.

5. The workpiece storage device according to claim 1, wherein the at least one machine learning model to which the sensor data is fed comprise several machine learning models that calculate respective binary output values for different statements about the loading state.

6. The workpiece storage device according to claim 5, wherein the control device is configured to determine an overall statement about the loading state from the respective binary output values that have been calculated by the several machine learning models,
wherein the determination of the overall statement takes place at least one of:
by at least one of linking the respective binary output values by predetermined linking rules, or
by feeding the binary output values to a further machine learning model.

7. The workpiece storage device according to claim 1, further comprising a memory device on which a machine learning model assigned to each receptacle is stored, the assigned machine learning models being trained to calculate individual binary output values from the sensor data indicating whether the workpiece for which the receptacle has been configured is located in the receptacle.

8. The workpiece storage device according to claim 7, wherein the control device is configured to specify from the individual binary output values at least one of how many receptacles do not contain a workpiece or which receptacles do not contain a workpiece.

9. The workpiece storage device according to claim 1, wherein the at least one sensor comprises a second sensor configured to acquire and transmit an ambient condition to the control device, in particular an ambient temperature or a measured value of a reference sensor, wherein the control device is configured to assess the effect of the ambient condition on the sensor values by a mathematical model and to normalize the sensor values with the help of the ambient condition value before the sensor values are fed to the at least one machine learning model.

10. The workpiece storage device according to claim 9, wherein the second sensor comprises an ambient condition sensor to monitor ambient temperature or a reference sensor to transmit a measured value.

11. A method for assessing a loading state of a pick-up device with receptacles for workpieces, in which the receptacles are individually adapted to shapes of the workpieces, the method comprising:

acquiring sensor data with at least one sensor to determine a presence and/or location of the workpieces in the receptacles;

transmitting the sensor data to a control device;

feeding the sensor data as input values to at least one machine learning model;

calculating from the input values in a machine learning model at least one binary output value, which is indicative of whether a statement about a loading state of the receptacles is applicable; and generating a signal including the binary output value.

12. A method for creating a machine learning model for assessing the loading state of a pick-up device with receptacles individually adapted to shapes of workpieces to be stored in the receptacles, the method comprising:

creating a number of different training data sets, wherein each training data set contains sensor data that has been acquired by at least one sensor for defined loading states, wherein the loading states for which individual training data sets have been recorded are different from each other, feeding the sensor data to a machine learning model as input values for a training of the machine learning model, wherein, for training, at least one binary output value for each of the different loading states is predetermined to the machine learning model, and wherein the binary output value indicates whether a statement about the loading state is applicable.

13. The method according to claim 12, wherein the different ambient conditions include ambient temperatures, and the ambient condition value of the ambient temperature is predetermined as an input value to the machine learning model in training in order to take into account the dependency of the sensor data on the ambient temperatures in the machine learning model.

14. The method according to claim 12, wherein sensor data recorded during operation of the pick-up device are used in order to post-train the machine learning model.

15. The method according to claim 12, wherein the different loading states include a loading state with a completely filled pick-up device and, for each receptacle, a loading state for which this receptacle is empty.

16. The method according to claim 15, wherein the number of training data sets corresponds to at least twice the number of receptacles in the pick-up device.

17. The method according to claim 12, wherein, for at least one loading state, training data sets are acquired under different ambient conditions, in particular ambient temperatures, and an ambient condition value of the ambient condition is predetermined as an input value to the machine learning model in training in order to take into account the dependency of the sensor data on the ambient condition in the machine learning model.

18. The method according to claim 17, wherein the at least one loading state comprises several loading states.

19. The method according to claim 12, wherein a dependency of the sensor data on at least one ambient condition, in particular the ambient temperature, is described by a mathematical model, wherein the mathematical model is determined by acquiring sensor data at different ambient conditions and analysis of the acquired sensor data as a function of the ambient condition, and wherein the sensor data is normalized by the mathematical model before being fed to the machine learning model as input values for a training of the machine learning model.

20. The method according to claim 19, wherein the at least one ambient condition includes ambient temperature, and wherein the mathematical model is further determined by acquiring sensor data for different loading states.

* * * * *